(12) United States Patent
Sun et al.

(10) Patent No.: US 8,200,165 B2
(45) Date of Patent: Jun. 12, 2012

(54) TECHNIQUES FOR TRANSMISSION OF CHANNEL QUALITY DATA IN WIRELESS SYSTEMS

(76) Inventors: Hongmei Sun, Beijing (CN); Changlong Xu, Beijing (CN); Qinghua Li, San Ramon, CA (US); Yuan Zhu, Beijing (CN); Senjie Zhang, Beijing (CN); Yang Y. G. Gao, Beijing (CN); Jong-Kae J. K. Fwu, Santa Clara, CA (US); Hujun Yin, Saratoga, CA (US)

( * ) Notice: Subject to any disclaimer, the term of this patent is extended or adjusted under 35 U.S.C. 154(b) by 344 days.

(21) Appl. No.: 12/459,268

(22) Filed: Jun. 26, 2009

(65) Prior Publication Data
US 2010/0329316 A1  Dec. 30, 2010

(51) Int. Cl.
*H04B 1/00* (2006.01)
(52) U.S. Cl. .............. 455/69; 455/67.11; 375/221
(58) Field of Classification Search ........... 455/67.11, 455/522, 450; 375/221; 370/330, 328, 352; 714/751, 790
See application file for complete search history.

(56) References Cited

U.S. PATENT DOCUMENTS

| | | | |
|---|---|---|---|
| 2007/0254598 A1 | 11/2007 | Bachl et al. | |
| 2008/0057969 A1* | 3/2008 | Agami et al. | 455/450 |
| 2008/0119213 A1 | 5/2008 | Ihm et al. | |
| 2008/0225792 A1* | 9/2008 | Naguib et al. | 370/330 |
| 2008/0282127 A1* | 11/2008 | Mantha et al. | 714/751 |
| 2008/0298306 A1* | 12/2008 | Larsson | 370/328 |
| 2009/0073958 A1* | 3/2009 | Xu | 370/352 |
| 2009/0190528 A1* | 7/2009 | Chung et al. | 370/328 |

FOREIGN PATENT DOCUMENTS
WO   2010/051519 A2   5/2010

OTHER PUBLICATIONS
International Search Report/Written Opinion for Patent Application No. PCT/US2009/062906, mailed May 28, 2010, 11 pages.

* cited by examiner

*Primary Examiner* — Lana N Le
*Assistant Examiner* — Golam Sorowar
(74) *Attorney, Agent, or Firm* — Thorpe North & Western LLP

(57) ABSTRACT

An embodiment of the present invention provides an apparatus, including a transceiver adapted for use in a wireless network using a fast feedback channel design that incorporates a 2-two level adaptive fast feedback channel framework separating uplink (UL) fast feedback channels into primary and secondary UL fast feedback channels.

15 Claims, 10 Drawing Sheets

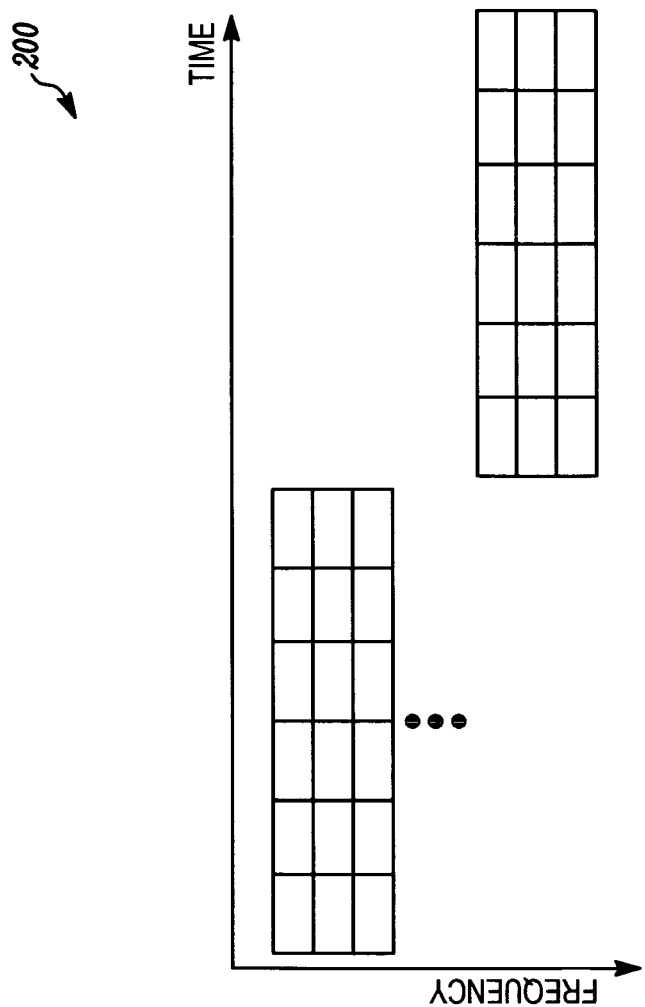
FIG. 2B HOPPING LOCALIZED — 220
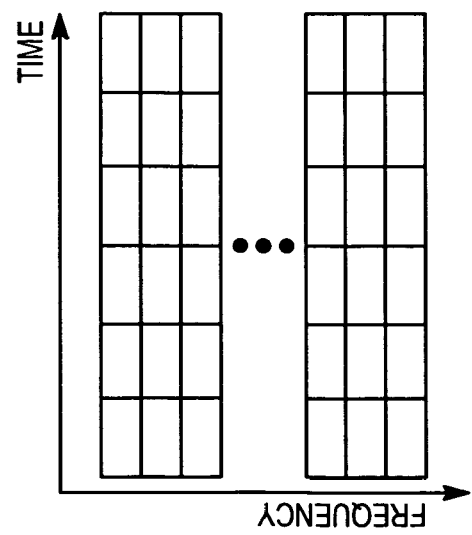
FIG. 2A DISTRIBUTED — 210

TECHNIQUES FOR TRANSMISSION OF CHANNEL QUALITY DATA IN WIRELESS SYSTEMS

BACKGROUND

In wireless communication systems, downlink (DL) DL transmissions will support multiple modes. The ability to adaptively switch among the transmission modes according to a mobile stations (MS) channel and traffic condition is critical to optimize the DL performance to achieve required capacity targets. A fast feedback channel is used to feed back the data of channel quality indicator and multiple input multiple output (MIMO) related feedback to support DL adaptation. In order to optimize the overall performance, fast feedback channels need to: 1) Feed back the appropriate metric for DL adaptation; 2) Reduce feedback latency to allow robust operation at higher speed; 3) Control feedback overhead to manage UL efficiency; and 4) Control feedback reliability to allow DL optimization.

Thus, a strong need exists for improved techniques for transmission of channel quality data in wireless systems.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

FIG. 2 depicts PCQICH with two 3×6 FMTs of an embodiment of the present invention;

Figure 1:
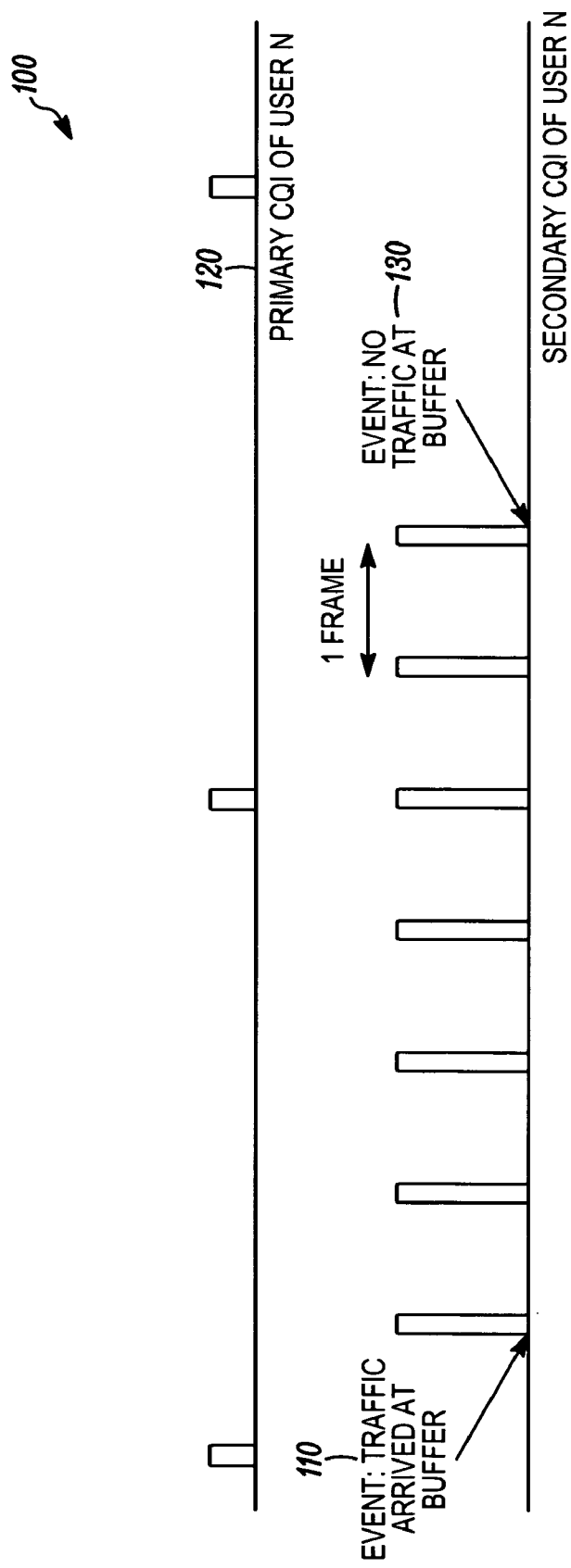
FIG. 1 depicts an example of periodicity and frequency of primary and secondary fast feedback channels in the time domain.

It will be appreciated that for simplicity and clarity of illustration, elements illustrated in the figures have not necessarily been drawn to scale. For example, the dimensions of some of the elements are exaggerated relative to other elements for clarity. Further, where considered appropriate, reference numerals have been repeated among the figures to indicate corresponding or analogous elements.

DETAILED DESCRIPTION

In the following detailed description, numerous specific details are set forth in order to provide a thorough understanding of the invention. However, it will be understood by those skilled in the art that the preset invention may be practiced without these specific details. In other instances, well-known methods, procedures, components and circuits have not been described in detail so as not to obscure the present invention.

Although embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. For example, "a plurality of stations" may include two or more stations.

Embodiments of the present invention provide a novel, fast feedback channel design for wireless systems which may include a 2-two level adaptive primary/secondary fast feedback channel framework. This primary/secondary fast feedback channel framework may further include the separation of UL fast feedback channels into primary (wideband CQI reports with fixed robust rate) and secondary (sub-band CQI reports with adaptive rate) UL fast feedback channels; and link adaptation on the secondary UL fast feedback channel with event-driven transmission, which may significantly improve the transmission efficiency with reduced overhead. This also allows flexibility for independent fast feedback channel design in order to optimize each channel performance (for example, the two channel might achieve optimal performance under different permutation modes)

An embodiment of the present invention provides that optimized BCH codes may be used for both primary (PCQICH) and secondary (SCQICH) fast feedback channels with simplified design and reduced complexity—although the present invention is not limited in this respect. This can be easily fit to different tile sizes.

Embodiments of the present invention provide semi-orthogonal sequences of length 12 for PCQICH supporting up to 6 information bits with optimized performance and may take advantage of larger diversity order. Embodiments of the present invention may also provide detail tile size and pilot pattern and receiver detection methods for fast feedback channel design, which can take advantage of both coding gain and frequency diversity gain. Also, some embodiments provide an advanced non-coherent receiver which supports fast feedback channel transmissions with non-coherent detection in very high speed, like 350 kmph.

Five major components may be provided in some embodiments of the present invention: 2-level adaptive primary/secondary fast feedback channel framework, link adaptation for SCQICH, channel structure of proposed fast feedback channel design, advanced non-coherent receiver and codes for PCQICH and SCQICH.

Two Levels Adaptive Primary/Secondary CQICH Framework and Protocol

In the proposed 2-level adaptive primary/secondary fast feedback channel framework, UL fast feedback channels are classified into 2 channels, categorized as a primary fast feedback channel (PCQICH) and a secondary fast feedback channel (SCQICH), and each of them may contain one or more types of fast feedback information. The primary CQI channel supports low rate, less frequent, periodic CQI feedback transmission. It is primarily designed to transmit average CQI and MIMO feedback information and provide reliable basic connections. PCQICH is available to all users who need to feedback CQI in UL. Base Station (BS) allocates resources for primary fast feedback channel and specifies the feedback frequency based on each individual user's channel variation characteristics. This information is sent to subscriber stations (SS) to regulate its CQI feedback behavior. The secondary fast feedback channel is designed to support more advanced features (e.g, MIMO, FFR, frequency selective scheduling (FSS)) with better efficiency and is used when there is data to be transmitted and it can provide CQI feedback more frequently and with finer granularity. That is, SCQICH supports high payload feedback of narrow band CQI and MIMO feedback information (which includes MIMO effective SINR per codeword, transmission rank, and PMI etc.) only on demand and the transmission can be event driven.

To guarantee robust transmission while maximizing throughput of secondary fast feedback channel, link adaptation is supported on it, and it will be done based on user location/channel condition to improve feedback efficiency. With this design, center users can take advantages of their high signal to interference noise ratio (SINR) and transmit CQIs at high rates with an improved efficiency. Thus, SCQICH targets to cover users with localized resource allocation at downlink that requires to feedback more CQI to support features such as FSS, MIMO etc., while users with very poor channel quality might not achieve meaningful gain feeding more CQI using secondary fast feedback channel. Per request from SS, BS will decide whether to allocate secondary fast feedback channel, when to allocate, the amount of resources and corresponding index, transmission frequency, rate, and relay these information to SS. As shown in FIG. 1, generally shown as 100, primary fast feedback channel 120 supports each user to feedback CQIs periodically in multiple of frames. Users' CQI feedback on secondary fast feedback control channel may be more frequent than that on primary fast feedback control channel.

Secondary fast feedback channel's allocation can be event driven depending on the user's traffic condition and channel variation. The ULSFBCH is allocated only when there is traffic in the buffer 110 or expected arrive within the next n frames and turned off when there is no traffic in the buffer 130 and not expected to arrive within the next m frames. Additionally, the primary fast feedback channel can provide a reference for power control. This reference can be used for power controlling both data channel and secondary fast feedback channel. Secondary fast feedback channel requires UL power control to help UE to achieve a minimum SINR so that the lowest MCS level can be supported.

Link Adaptation for SCQICH

There are multiple ways to support link adaptations on SCQICH. Design Option 1: Link adaptation can be based on long term channel statistics (ex, UL geometry SINR measured over a long term at the base station). Design Option 2: SS starts to transmit using the lowest modulation. BS tunes the rate based on channel measurement using UL dedicated pilot of SCQICH once SS gets allocated and starts to feed back CQI on SCQICH. Design option 3: PCQICH provides dedicated pilots to facilitate channel measurement for each user. For users that use SCQICH, initial MCS level is selected based on channel quality measured by PCQICH, and the rate of each user can be turned in similar way as Design option 2. Design option 4: to adaptive rate based on dedicated pilots of candidate (sounding) subchannels.

BS allocates candidate channels to users requesting to transmit CQI in SCQICH. The channel qualities of these candidate subchannels for each user are measured by dedicated pilots. In terms of the qualities, the corresponding MCSs of SCQICH in the specified subchannel for selected users are allocated. In the following frame, the CQI data are transmitted in the allocated subchannels.

For all the above design options, link adaptation can only be coarse in the sense that certain amount of margin needs to be maintained to compensate the UL indeterminable channel variation.

In embodiments of the present invention, the proposed block codes based unified coding can support up to 12/24 information bits as described below, based on one specific tile structure (3×6 or 6×6, or 2×6), but the design can be easily adapt to different resource block size (or tile structure) and the present invention is not intended to be limited in this respect.

Additionally, considering total bits per CQI per user varies depending on, for example, different MIMO mode it chooses, finer granularity levels will be provided via supporting mixed rates/MCS levels within one or among multiple resource blocks to best use the resources.

Channel Structure of PCQICH and Detection

There are 3 ways to design PCQICH depending on if the permutation mode of the UL feedback channel is localized, distributed or hopping localized, while the latter two share the same tile structure and pilot patterns. In localized mode, a PCQICH logical channel occupies one tiles size of 6 contiguous subcarriers by 6 OFDM symbols (6×6 for short), which is chosen from different UL localized control resource units to achieve more spreading gain, while in the other two permutation modes, there are 2 ways: 1) A PCQICH logical channel occupies 2 UL feedback mini-tiles (UL FMT), which are chosen from different UL distributed control resource units for frequency diversity. Here each UL FMT is defined as 3 contiguous subcarriers by 6 OFDM symbols (3×6 for short), as shown in the FIG. 2, generally as 200. A PCIQCH logical channel occupies 3 UL feedback mini-tiles (UL FMT), which are chosen from different UL distributed control resource units for frequency diversity. Here each UL FMT is defined as 2 contiguous subcarriers by 6 OFDM symbols (2×6 for short), which is similar as 3×6. In all these 3 cases, same block size will be used, which is 6×6. Distributed is illustrated at 210 and hopping localized at 220.

Figure 3:
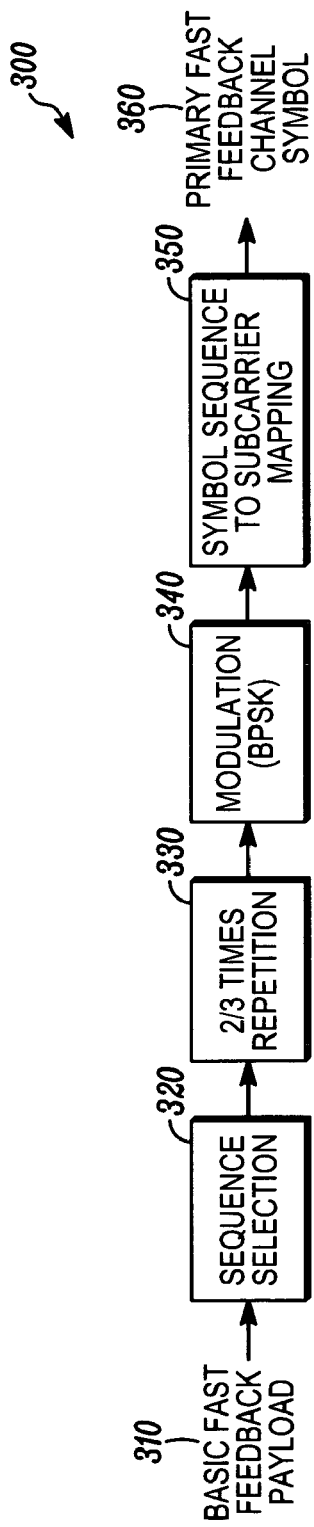
FIG. 3 depicts a channel structure for UL Primary Feedback Channel according to an embodiment of the present invention.
Figure 4:
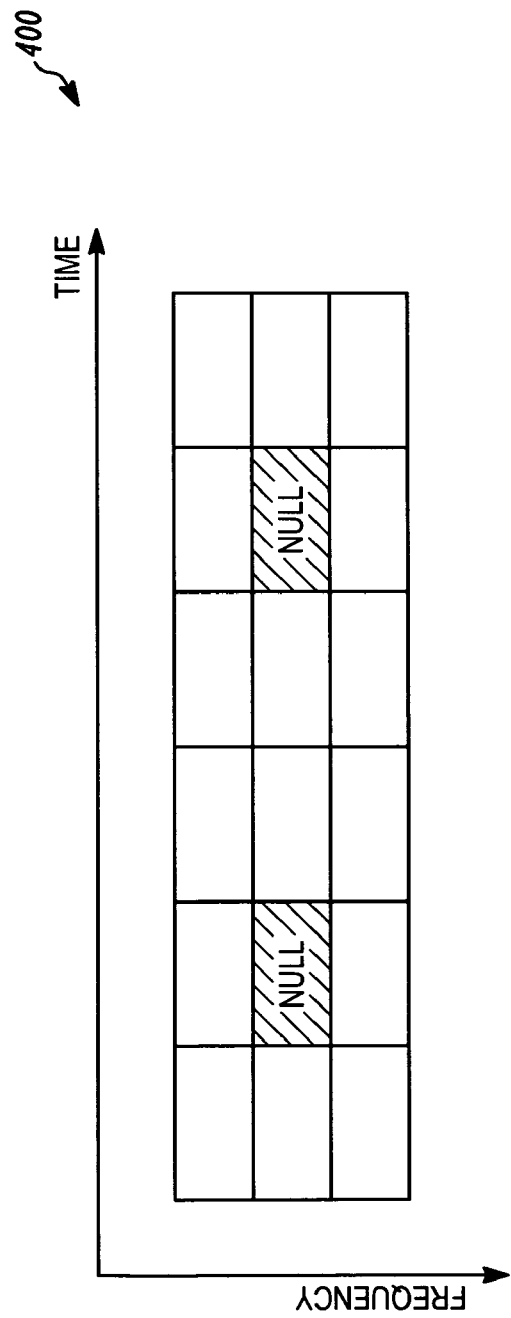
FIG. 4 depicts a tile structure (3×6) for PCQICH according to an embodiment of the present invention.

FIG. 3 at 300 is illustrated the PCQICH channel symbol generation procedure for tile size 3×6 and 2×6. A 4-bits payload 310 is illustrated as an example herein, but the present invention is not limited in this respect. Sequence selection is provided at 320. Firstly the 4-bits payload 310 is encoded to 16 bits by block code described in table 3 below then applied with repetition-2 330, when using tile size 2×6, the 4-bits payload 310 is encoded to 12 bits by semi-orthogonal sequence in table 1 and then applied with repetition-3. After that the repeated coded bits are BPSK modulated 340 and mapped to one UL FMT 350 and outputting feedback channel symbol 360. For each tile of 3×6 in PCQICH, two tones are null, as shown in FIG. 4 at 400, while for tile size 2×6, all tones are used for data transmission.

In an embodiment of the present invention, the tile structure of 6×6 can be derived in a similar way to that as provided in FIG. 1, or using the structure of SCQICH (described in below in reference to FIG. 5) for unified pilot pattern to reduce design complexity. This will not cause any performance difference. And the channel symbol generation procedure when using tile size of 6×6 will be also similar, except for just directly encoding the 4-bits payload into 32 bits to achieve more spreading gain. In this case, 2-times repetition will be skipped.

Non-coherent detection can be used for PCQICH detection as described below:

1) Tile size 6×6 in localized mode

For jth receiver antenna, the received signal can be written as (1), where $R_j(n,k)$ stands for received signal at j-th antenna, $H_j(n,k)$ stands for channel response, $P_t(n,k)$ stands for coded bits and $N_j(n,k)$ stands for while noise.

$$R_j(n,k) = H_j(n,k)P_t(n,k) + N_j(n,k) \quad (1)$$

With non-coherent receiver, the received signal is correlated with all possible sequences shown in (2)

$$R_j(n,k)P_i^*(n,k) = H_j(n,k)P_t(n,k)P_i^*(n,k) + N_j'(n,k) \quad (2)$$

It is assumed that the $H_j(n,k)$ is almost same in the CQICH, by summarization in 32 subcarriers of tile 6×6, $$\Lambda_{jt} = \left| \sum_{k=0}^{31} R_j(n,k) P_i^*(n,k) \right| \quad (3)$$

$$= |H_j(n)| \left| \sum_{k=0}^{31} P_t(n,k) P_i^*(n,k) \right| + N''$$

Assuming ant number is AntNum, then the results of all receive antennae are combined as shown in (7):

$$\Lambda_t = \sum_{j=0}^{AntNum-1} \Lambda_{jt} \quad (4)$$

The $\Lambda = \max\{\Lambda_t, t=0, 1, \ldots 31\}$ is regarded as the detected coded bits $P_t$ and thus the 4-bit payload can be detected.

2) Tile size 3×6 in distributed/hopping distributed mode
In the receiver, non-coherent detection is used as described in the following:
For jth receiver antenna for tile 1 & 2, the received signal can be written as (1)
In the receiver, non-coherent detection is used as described in the following:
For jth receiver antenna for tile 1 & 2, the received signal can be written as (1)

$$R_j^m(n,k) = H_j^m(n,k) P_t(n,k) + N_j^m(n,k) \quad (5)$$

Where m stands for the tile index and equals to 1 or 2.

Non-coherent receiver: the received signal is correlated with all kind of sequence shown in (5)

$$R_j^m(n,k) P_i^*(n,k) = H_j^m(n,k) P_t(n,k) P_i^*(n,k) + N_j^{m\prime}(n,k) \quad (6)$$

Assumed that the $H_j^m(n,k)$ is almost same in each tile of 3×6.

By summarization in 16 subcarriers, $$\Lambda_{jt}^m = \left| \sum_{k=0}^{15} R_j^m(n,k) P_i^*(n,k) \right| \quad (7)$$

$$= |H_j^m(n)| \left| \sum_{k=0}^{15} P_t(n,k) P_i^*(n,k) \right| + N''$$

The CQI data in two tiles will be summarized as shown in (10)

$$\Lambda_{jt} = \Lambda_{jt}^1 + \Lambda_{jt}^2 \quad (8)$$

Totally, the four anttena are combined as shown in (12):

$$\Lambda_t = \sum_{j=0}^{AntNum-1} \Lambda_{jt} \quad (9)$$

The $\Lambda = \max\{\Lambda_t, t=0, 1, \ldots 15\}$ is regarded as the detected $P_t$ 3) Tile size 2×6 in distributed/hopping distributed mode Similar as tile size 3×6 and the only difference is the sequence length is 12 and we do 3-times repetition.

Here we just use 4 bits payload as one example to ease the explanation of the channel structure of PCQICH. Basically 4~6 bits will a reasonable range for average feedback information in PCQICH since 4 bits is needed for effective SINR while 1~2 bits is needed for rank adaptation for different MIMO mode. The exact bits number for PCQICH will depends on specific wireless system and our design can be easily extended to different payload bits due to the block code based unified channel coding proposed in below support up to 12/24 bits.

Advanced Receiver for Non-Coherent Detection

The transmitter sends one of the predefined sequences over adjacent frequency subcarriers and adjacent OFDM symbols. Each entry of the sequence modulates one subcarrier. If the channel correlation is known to the receiver, it is possible to apply an advanced receiver in this section. The channel correlation for different subcarriers can be estimated from channel delay spread. The channel correlation for different OFDM symbols can be estimated from Doppler. The advanced receiver is especially helpful to overcome the error floor when direct cross correlation is applied when the correlation of two sub carriers located in different frequency and time becomes low, e.g. when the speed is high 1) Signal Model The transmitter sends one of the predefined sequences over adjacent frequency subcarriers and adjacent OFDM symbols. Each entry of the sequence modulates one subcarrier. The receiver wants to detect which of the predefined sequences was sent without estimating the channel response. Denote predefined sequences as $$c_i = [c_i(1) \ldots c_i(N_f)]^T, \text{ for } =1, \ldots, N_c, \quad (10)$$

where $N_f$ is the length of the sequence and $N_c$ is the number of predefined sequences. The received signal is given by $$r(j) = c_{i_0}(j) h(j) + n(j), \text{ for } j=1, \ldots, N_f, \quad (11)$$

where $i_0$ is the index of the transmitted sequence; j is the index of the subcarriers in the feedback channel; h(j) is the channel response of the j-th subcarrier; n(j) is the AWGN for j-th subcarrier. Furthermore, h(j) and n(j) are assumed to be zero mean and Gaussian distributed with variances 1 and $\sigma^2$, i.e. $h(j) \sim CN(0,1)$ and $n(j) \sim CN(0,\sigma^2)$. The channel responses are assumed unknown to the receiver but the correlations of the channel responses across subcarriers are assumed known. Namely, we have $$h=[h(1) \ldots h(N_f)]^T \sim CN(0,R), \quad (12)$$

where $R=E(hh^H)$.

2) Sequence Detection

Let
$$r_{c_i}(j) = r(j)c_i^{-1}(j), \text{ for } j = 1, \ldots, N_f. \quad (13)$$

Then, $$r_{c_i}(j) = h(j)\underbrace{\frac{c_{i_0}(j)}{c_i(j)}}_{l_{c_i}(j)} + \frac{n(j)c_i^{-1}(j)}{\eta_j}$$

$$= h(j)l_{c_i}(j) + \eta(j)$$

Since $n(j)$ and $c_i(j)$ are independent and $\|c_i(j)\|=1$, $n(j)$ and $\eta(j)$ has the same distribution. Moreover, $l_{c_i}(j)$ constant equals 1 if the candidate sequence $c_i$ is the transmitted sequence $c_{i_0}$. Otherwise, $l_{c_i}(j)$ is an independent and random phase rotation for $j=1, \ldots, N_f$ and therefore the first term in (5) is a independent, Gaussian random variable.

Since each sequence is equally likely, the maximum posterior detection is the same as maximum likelihood detection. The maximum likelihood detection of the transmitted sequence $c_{i_0}$ is given by:

$$i_0 = \underset{i=1,\ldots,N_c}{\operatorname{argmax}} p(r \mid c_i) \quad (14)$$

The conditional probability can be computed as $$p(r \mid c_i) = \int p(r \mid c_i, h) p(h) dh \quad (15)$$

$$= \int p(r_{c_i} - h) p(h) dh$$

$$= c \int \exp\left(-\frac{1}{\sigma^2}(r_{c_i} - h)^H(r_{c_i} - h)\right) \exp(-h^H R^{-1} h) dh$$

$$= c \int \exp\left(-h^H \underbrace{(R^{-1} + \sigma^{-2}I)}_{R_r^{-1}} h + 2\operatorname{Re}\left(\frac{1}{\sigma^2} r_{c_i}^H h\right)\right) dh$$

$$= c \int \exp(-h^H R_r^{-1} h + 2\operatorname{Re}(r_{c_i}^H h)) dh$$

$$= c \exp\left(\frac{1}{\sigma^4} r_{c_i}^H R_r r_{c_i}\right)$$

where c is the normalization factor that doesn't depend on $c_i$. Substitution of (6) into (5) gives $$i_0 = \underset{i=1,\ldots,N_c}{\operatorname{argmax}} p(r \mid c_i) \quad (16)$$

$$= \underset{i=1,\ldots,N_c}{\operatorname{argmax}} r_{c_i}^H R_r r_{c_i}$$

where $R_r=(R^{-1}+\sigma^{-2}I)^{-1}$.

If the correlation R is not known at the receiver, R can be estimated from the previous uplink traffic such as association request and ACK. Otherwise, the maximum a posterior (MAP) detector can be obtained from (14) by adding one more term as $$i_0 = \underset{i=1,\ldots,N_c}{\operatorname{argmax}} p(r \mid c_i), \quad (17)$$

Where $$p(r|c_i) = {}_R\!\int p(r|c_i,R)p(R). \quad (18)$$

The base station can obtain samples of R for estimating the distribution of R, i.e. p(R) and evaluate (18) numerically. For low complexity, R may be parameterized by Doppler speed and only a few, e.g. 4 speeds are chosen for the evaluation of (18). For further complexity reduction, R of a speed, say a medium or a high speed e.g. 100 km/h or 300 km/h, is used in (14) without incurring (17) and (18). The reason is that R performs as a low pass filter on $r_{c_i}$ and the Doppler speed roughly control the highest pass frequency. The exact R can be replaced by various low pass filters with small performance losses.

For complexity reduction, some quantity can be pre-computed and stored. For example, $R_r$ can be computed for different speeds beforehand.

Channel Structure of SCQICH and Detection

Similarly as PCQICH, the SCQICH is design with block size of 6×6 while tile size can be either 3×6 or 2×6 in distributed/hopping localized mode or 6×6 in localized/distributed mode.

1) Tile size 3×6 one 6×6 block is constructed from 2 UL FMTs, which are chosen from different UL DRU(distributed resource unit). An UL FMT is a time-frequency block of 3 contiguous subcarriers by 6 OFDM symbols and has 3 fixed-location pilot tones;

2) Tile size 2×6 one 6×6 block is constructed from 3 UL FMTs, which are chosen from different UL DRU(distributed resource unit). An UL FMT is a time-frequency block of 2 contiguous subcarriers by 6 OFDM symbols and has 2 fixed-location pilot tones;

3) Tile size 6×6: has 4 fixed-location pilot tones

Figure 5:
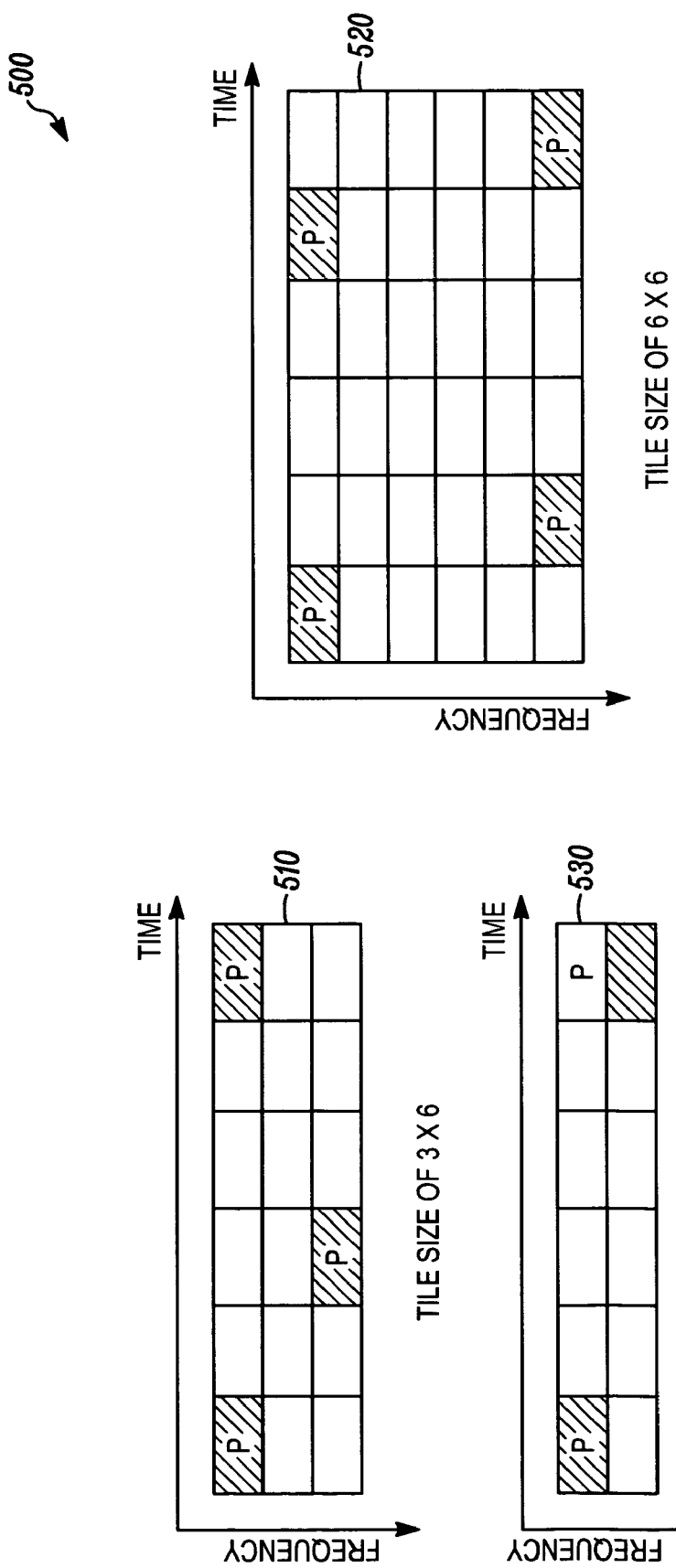
FIG. 5 depicts control tile structures for SCQICH according to an embodiment of the present invention.

FIG. 5, generally at 500 shows the tile structure of different tile sizes mentioned above including 3×6 310, 6×6 320, and 2×6 330.

Figure 6:
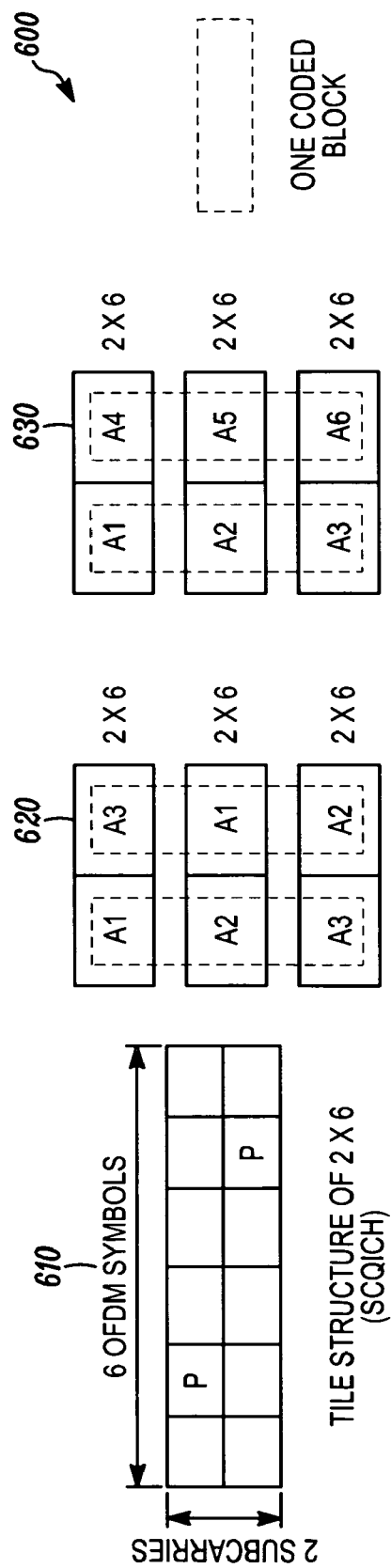
FIG. 6 depicts a tile structure and the mapping from coded block to tile structure 2×6 according to an embodiment of the present invention.

FIG. 6, generally at 600, illustrates a tile structure and the mapping from coded block to tile structure 2×6 as illustrated at 610, 620 and 630.

Figure 7:
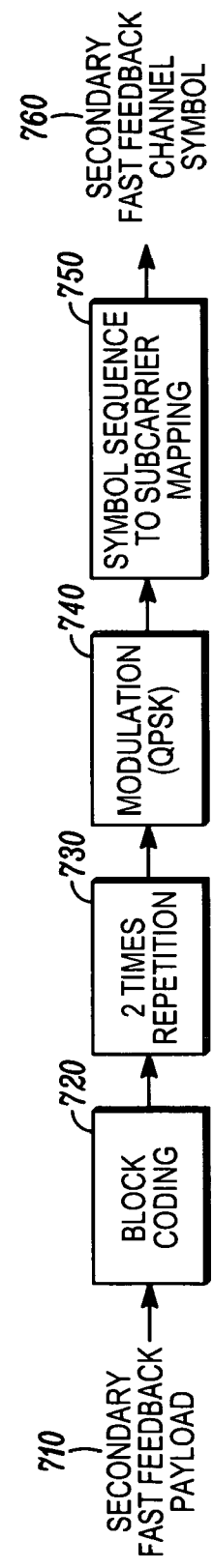
FIG. 7 depicts the channel structure of an uplink secondary fast feedback channel according to an embodiment of the present invention.

The process of composing the SCQICH and channel structure of uplink secondary fast feedback channel is shown in the FIG. 7 at 700. First, each block UL enhanced feedback payload information bit (1~11 bits) is encoded 710 and 720 to either 30 bits length when using tile size 3×6 or tile size 2×6 (last 2 column are punctured) or 32 bits length when using tile size 6×6 by the block code described by table 3 and table 4 described in below. Then the sequence is repeated by 2 times 730 and QPSK modulated 740. The modulated symbols are mapped 750 to data subcarrier of the uplink enhanced fast feedback control channel. Secondary fast feedback channel symbol result shown at 760. Specifically, the mapping from coded block to tile structure of 2×6 is shown in FIG. 6.

A control data payload of the SCQICH has variable size depending on the reporting format in which the combination of the feedback information is given. Each SCQICH can support feedback payload information bit size in the range of 1~12 bits. In addition, rates can be adapted for different users based on its channel condition. The repetition can be skipped to support higher rate (up to 24 payload bits) in SCQICH. The receiver detection of SCQICH channels will be coherent with MLD receiver.

Channel Coding for CQICH

1) Semi-Orthogonal Sequence for PCQICH

Table 1 shows the semi-orthogonal sequence for PCQICH when using tile size 2×6. The cross-correlation of these sequences are 6, 4, 2, 0. This can support transmitting up to 6 information bits, and the former 16 sequences can be used when transmitting 4 bits, former 32 sequences when transmitting 5 bits.

TABLE 1

12-bit length semi orthogonal sequence

| # | Sequence |
|---|---|
| 1 | 1 1 1 1 1 1 1 1 1 1 1 1 |
| 2 | 1 0 1 0 1 1 1 0 0 0 1 0 |
| 3 | 1 0 0 1 0 1 1 1 0 0 0 1 |
| 4 | 1 1 0 0 1 0 1 1 1 0 0 0 |
| 5 | 1 0 1 0 0 1 0 1 1 1 0 0 |
| 6 | 1 0 0 1 0 0 1 0 1 1 1 0 |
| 7 | 1 0 0 0 1 0 0 1 0 1 1 1 |
| 8 | 1 1 0 0 0 1 0 0 1 0 1 1 |
| 9 | 1 1 1 0 0 0 1 0 0 1 0 1 |
| 10 | 1 1 1 1 0 0 0 1 0 0 1 0 |
| 11 | 1 0 1 1 1 0 0 0 1 0 0 1 |
| 12 | 1 1 0 1 1 1 0 0 0 1 0 0 |
| 13 | 0 0 0 0 0 0 0 0 1 1 1 1 |
| 14 | 0 0 0 0 0 0 1 1 0 1 0 1 |
| 15 | 0 0 0 0 0 1 0 1 0 0 1 1 |
| 16 | 0 0 0 0 0 1 1 0 1 0 1 0 |
| 17 | 0 0 0 0 1 0 0 1 1 0 0 1 |
| 18 | 0 0 0 0 1 0 1 0 0 1 1 0 |
| 19 | 0 0 0 0 1 1 0 1 0 1 0 0 |
| 20 | 0 0 0 1 0 0 0 1 0 1 1 0 |
| 21 | 0 0 0 1 0 0 1 0 1 0 0 1 |
| 22 | 0 0 0 1 0 1 0 0 1 1 0 0 |
| 23 | 0 0 0 1 0 1 1 1 1 1 1 1 |
| 24 | 0 0 0 1 1 0 0 0 0 1 0 1 |
| 25 | 0 0 0 1 1 1 1 0 0 0 0 0 |
| 26 | 0 0 1 0 0 0 1 0 1 1 0 0 |
| 27 | 0 0 1 0 0 1 0 0 1 0 0 1 |
| 28 | 0 0 1 0 0 1 1 1 0 0 0 0 |
| 29 | 0 0 1 0 1 0 0 0 0 0 1 1 |
| 30 | 0 0 1 0 1 1 0 1 1 1 1 1 |
| 31 | 0 0 1 1 0 0 0 0 1 0 1 0 |
| 32 | 0 0 1 1 0 0 0 1 0 0 0 1 |
| 33 | 0 0 1 1 1 0 1 0 1 1 1 1 |
| 34 | 0 0 1 1 1 1 1 1 0 0 1 1 |
| 35 | 0 1 0 0 0 0 0 1 1 0 1 0 |
| 36 | 0 1 0 0 0 1 0 0 0 0 0 1 |
| 37 | 0 1 0 0 0 1 1 1 1 0 0 1 |
| 38 | 0 1 0 0 1 0 1 1 1 1 1 1 |
| 39 | 0 1 0 0 1 1 0 0 0 0 1 0 |
| 40 | 0 1 0 1 1 0 0 0 1 0 0 0 |
| 41 | 0 1 1 0 0 0 0 1 0 1 0 0 |
| 42 | 0 1 1 0 0 0 1 0 0 0 1 0 |
| 43 | 0 1 1 0 0 1 1 0 1 1 1 1 |
| 44 | 0 1 1 0 1 1 1 0 0 1 0 0 |
| 45 | 0 1 1 1 0 0 1 1 0 1 1 1 |
| 46 | 0 1 1 1 0 1 0 1 1 1 1 0 |
| 47 | 0 1 1 1 1 0 0 1 1 0 1 1 |
| 48 | 0 1 1 1 1 1 0 0 1 1 0 1 |
| 49 | 0 0 0 0 0 0 0 1 1 1 0 0 |
| 50 | 0 0 0 0 0 0 1 0 0 0 1 1 |
| 51 | 0 0 0 0 0 1 0 0 0 1 1 0 |
| 52 | 0 0 0 0 0 1 0 0 0 1 0 1 |
| 53 | 0 0 0 0 1 0 1 1 0 0 0 0 |
| 54 | 0 0 0 0 1 1 0 0 0 0 0 1 |
| 55 | 0 0 0 0 1 1 1 1 0 1 1 1 |
| 56 | 0 0 0 1 0 0 1 0 0 1 0 0 |
| 57 | 0 0 0 1 0 0 1 1 1 0 1 0 |

TABLE 1-continued 12-bit length semi orthogonal sequence

| # | Sequence |
|---|---|
| 58 | 0 0 0 1 0 1 0 0 1 0 1 1 |
| 59 | 0 0 0 1 0 1 0 1 0 0 0 0 |
| 60 | 0 0 0 1 1 0 0 1 0 0 1 1 |
| 61 | 0 0 0 1 1 0 1 1 1 1 0 1 |
| 62 | 0 0 0 1 1 1 1 0 1 1 1 0 |
| 63 | 0 0 1 0 0 0 0 0 0 1 0 1 |
| 64 | 0 0 1 0 0 0 0 1 0 0 1 0 |

2) Block Codes Based Unified Channel Coding for Primary/SCQICH

The information bits of CQICH are encoded by two separate of block codes. The number of information bits can be from 1 to 11 bits, denoted by $a_0, a_1, a_2, \ldots, a_{k-1}$ where K= 1, . . . , 11. There are two block codes defined in Table 3 and Table 4 for different number of information bits. The codeword can be obtained by linear combination of the 6 or 12 basis sequences denoted as Si,n in table 3 and table 4

TABLE 3

Basis sequences for (32, K < 7) codes

| N | S0,n | S1,n | S2,n | S3,n | S4,n | S5,n |
|---|---|---|---|---|---|---|
| 0 | 1 | 0 | 1 | 1 | 0 | 1 |
| 1 | 0 | 1 | 0 | 0 | 0 | 1 |
| 2 | 1 | 1 | 0 | 1 | 0 | 1 |
| 3 | 0 | 0 | 0 | 1 | 0 | 0 |
| 4 | 0 | 0 | 1 | 0 | 0 | 1 |
| 5 | 0 | 1 | 1 | 1 | 0 | 0 |
| 6 | 1 | 1 | 1 | 0 | 0 | 0 |
| 7 | 1 | 0 | 0 | 0 | 0 | 0 |
| 8 | 0 | 0 | 0 | 0 | 1 | 1 |
| 9 | 1 | 1 | 0 | 0 | 1 | 0 |
| 10 | 0 | 1 | 0 | 1 | 1 | 0 |
| 11 | 0 | 1 | 1 | 0 | 1 | 1 |
| 12 | 1 | 0 | 1 | 0 | 1 | 0 |
| 13 | 1 | 0 | 0 | 1 | 1 | 1 |
| 14 | 0 | 0 | 1 | 1 | 1 | 0 |
| 15 | 1 | 1 | 1 | 1 | 1 | 1 |
| 16 | 0 | 0 | 0 | 0 | 0 | 1 |
| 17 | 0 | 0 | 0 | 1 | 1 | 0 |
| 18 | 0 | 0 | 1 | 1 | 0 | 0 |
| 19 | 0 | 1 | 1 | 0 | 0 | 1 |
| 20 | 1 | 0 | 0 | 1 | 0 | 1 |
| 21 | 0 | 0 | 1 | 0 | 1 | 1 |
| 22 | 1 | 1 | 0 | 1 | 1 | 1 |
| 23 | 1 | 0 | 1 | 1 | 1 | 1 |
| 24 | 0 | 1 | 1 | 1 | 1 | 0 |
| 25 | 1 | 1 | 1 | 1 | 0 | 1 |
| 26 | 1 | 1 | 1 | 0 | 1 | 0 |
| 27 | 0 | 1 | 0 | 1 | 0 | 0 |
| 28 | 1 | 0 | 1 | 0 | 0 | 0 |
| 29 | 1 | 0 | 0 | 0 | 1 | 0 |
| 30 | 0 | 1 | 0 | 0 | 1 | 1 |
| 31 | 1 | 1 | 0 | 0 | 0 | 0 |

TABLE 4

Basis sequences for (30, 7 ≦ K ≦ 12) code

| | |
|---|---|
| 0 | 1 0 0 0 0 0 0 0 0 0 0 1 |
| 1 | 0 1 0 0 0 0 0 0 0 0 0 0 |
| 2 | 1 0 0 0 0 0 0 1 0 0 0 1 |
| 3 | 1 1 0 0 1 0 0 0 0 0 0 0 |
| 4 | 0 1 0 0 0 0 1 1 0 0 0 1 |
| 5 | 0 0 0 0 1 1 0 1 0 0 0 0 |
| 6 | 0 0 0 0 1 0 1 0 1 0 0 1 |
| 7 | 1 0 0 0 0 1 1 0 0 1 0 0 |
| 8 | 0 1 0 1 0 1 0 0 1 0 0 0 |

TABLE 4-continued

Basis sequences for (30, 7 ≤ K ≤ 12) code

| | |
|---|---|
| 9  | 001000011101 |
| 10 | 100110000110 |
| 11 | 111100100000 |
| 12 | 011001010010 |
| 13 | 100010011011 |
| 14 | 110010100100 |
| 15 | 010101110000 |
| 16 | 101011011000 |
| 17 | 010010101111 |
| 18 | 100101110100 |
| 19 | 011111001000 |
| 20 | 101000111110 |
| 21 | 010111000111 |
| 22 | 001100111000 |
| 23 | 001011000110 |
| 24 | 000100101010 |
| 25 | 001001000101 |
| 26 | 000100001010 |
| 27 | 001000000100 |
| 28 | 000100000011 |
| 29 | 001000000001 |

Suppose $b_0, b_1, b_2, \ldots, b_{N-1}$ is the one of the encoded codeword where N=32. One of the components can be expressed by:

$$b_n = \sum_{i=0}^{K-1} (a_i \cdot s_{i,n}) \bmod 2$$

where n=0, 1, 2, ..., N−1.

Puncturing and repetition may be applied to the encoded codeword. The resulting sequence $c_0, c_1, c_2, \ldots, b_{M-1}$ can be expressed as: $c_j = b_{(j \bmod N)}$ where j=0, 1, 2, ..., M−1.

C Performance Evaluation

Figure 8:
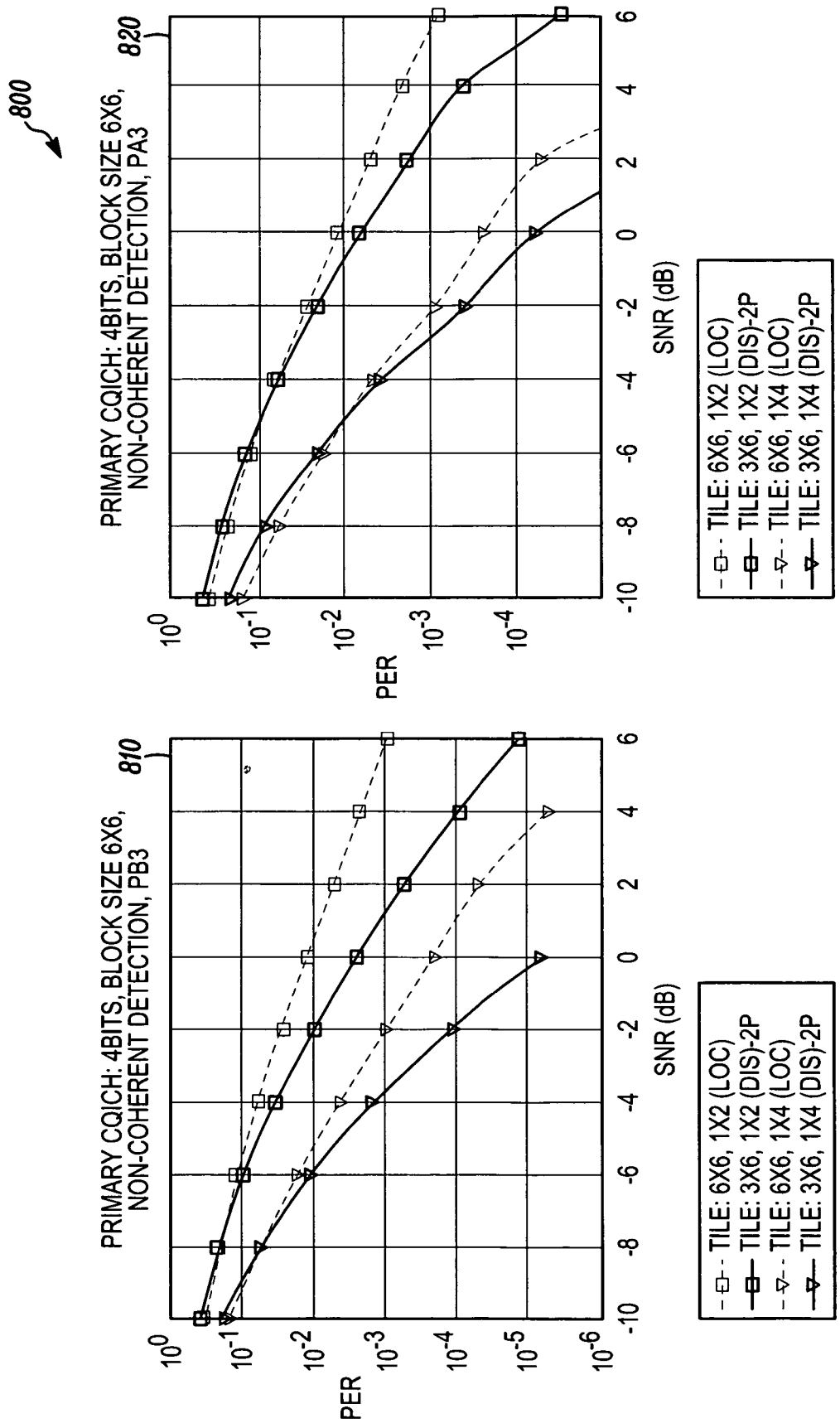
FIG. 8 depicts a SNR vs. PER curve of a 4-bit PCQICH (PB-3 kmph and PA-3 kmph) of tile size 3×6/6×6 according to an embodiment of the present invention.

Based on the simulation platform of our 802.16 m LLS (link level simulator), the performance of different permutation modes are evaluated. Channel models includes: ITU PA 3 km/h and ITU PB 3 km/h and for 4-bits PCQICH performance evaluation we use non-coherent detection. For SCQICH related evaluation, we use ML detection with MMSE based channel estimation. FIG. 8 at 800 illustrates the performance results of PCQICH as a SNR vs. PER curve of 4-bit PCQICH (PB-3 kmph and PA-3 kmph) of tile size 3×6/6×6.

Figure 9:
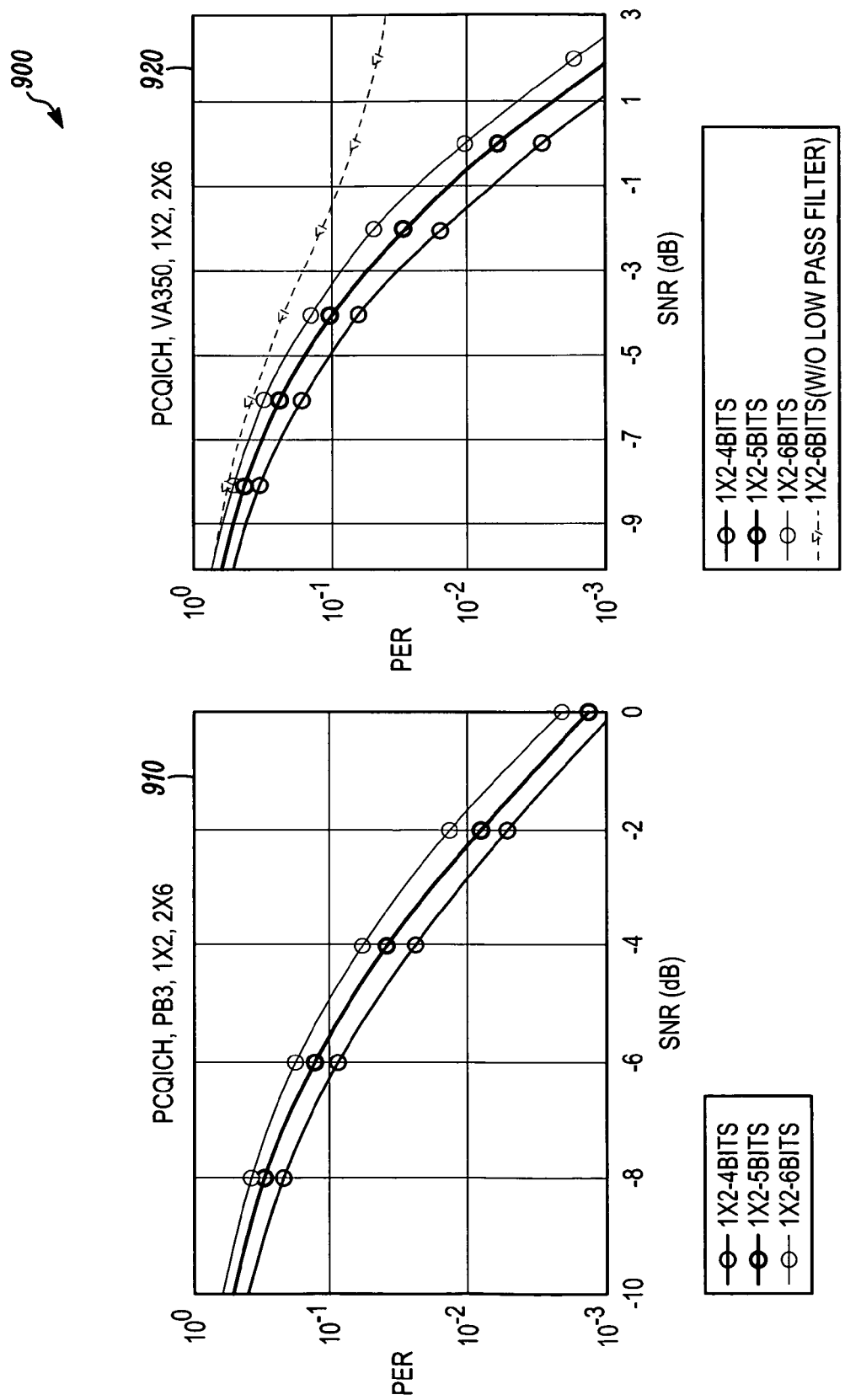
FIG. 9 shows a SNR vs. PER curve of 4/5/6-bit PCQICH (PB-3 kmph and VA-350 kmph) of tile size 2×6 according to an embodiment of the present invention.

FIG. 9 at 900 is a SNR vs. PER curve of 4/5/6-bit PCQICH (PB-3 kmph and VA-350 kmph) of tile size 2×6.

The curves of FIG. 8 shows that with PER=10% tile size 6×6 in localized permutation will be slightly better than that of tile size 3×6 in distributed mode while for lower PER, tile size 3×6 will be better than 6×6. Basically the curves with tile size of 3×6 are sharper than that of 6×6, but the difference shrinks somehow when antenna number increases. In practical system, we can choose the appropriate one according to the design target of CQICH. Table 5 listed the SNR (dB) needed in different cases to achieve target PER 1% and 10%. It is obvious that with 4-receive antenna, the needed SNR can be as low as −8.5 dB, which means our design is very robust to for the system to maintain reliable CQI connection and coverage up to cell size of 5 km. (we have previous evaluation that operating point of cell size up to 5 km will be around −8 dB). FIG. 9 at 900 shows the results of PCQICH with size 2×6 for 4/5/6 payload bits. The slope is slightly sharper than that of 3×6 due to more frequency diversity gain from repetition 3. Additionally from results under VA350 kmph clearly shows advantage of proposed advanced receiver for non-coherent detection. Without this, we see EF before getting PER=0.01.

TABLE 5

SNR (dB) of 4-bits PCQICH required for PER of 1% and 10%

| Channel | Tile | 2 RX | | 4 RX | |
|---|---|---|---|---|---|
| Model | size | PER = 0.1 | PER = 0.01 | PER = 0.1 | PER = 0.01 |
| PB-3kmph | 6 × 6 | −5.5 | 0.5 | −9.2 | −5.2 |
|  | 3 × 6 | −6 | −2 | −8.9 | −5.9 |
| PA-3kmph | 6 × 6 | −5.7 | 0.3 | −9.3 | −5.3 |
|  | 3 × 6 | −5.5 | −0.8 | −8.5 | −5.3 |

2) Performance Results of SCQICH

Figure 10:
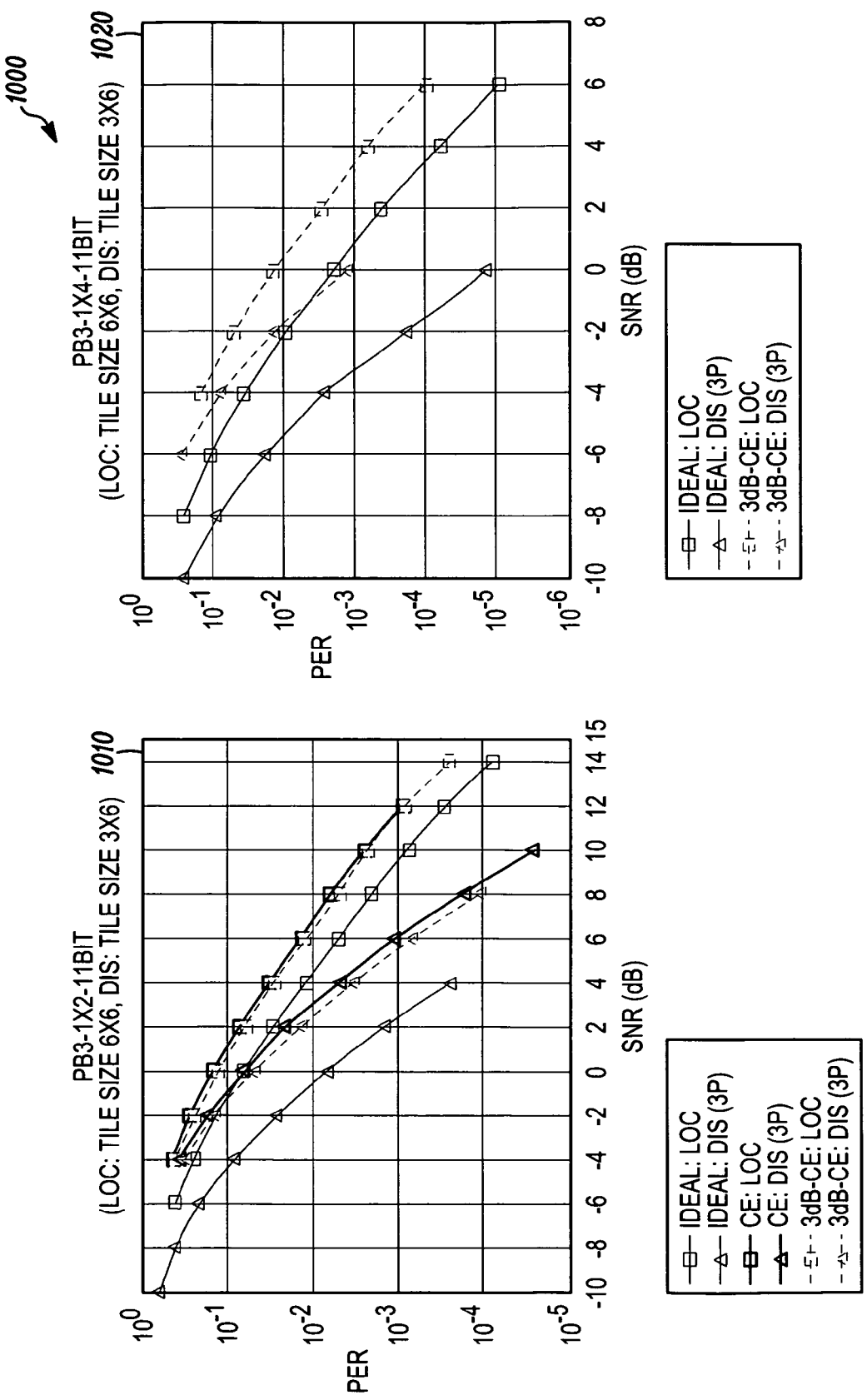
FIG. 10 shows SNR vs. PER curve of 11-bit SCQICH (PB-3 kmph, 1×2 and 1×4) according to an embodiment of the present invention.

FIG. 10 at 1000 shows a SNR vs. PER curve of 11-bit SCQICH (PB-3 kmph, 1×2 and 1×4) and demonstrates the performance results of 1×2 and 1×4 under PB-3 kmph when transmitting 11 bits payload with block size of 6×6. We can see clearly that the results of tile size 3×6 outperforms tile size 6×6 about 2 dB at PER=10% and 4 dB at PER=1% when there are 2 receive antenna while the performance advantage will become 1 dB and 2.5 dB respectively in case of 4 receive antennae. That is a benefit from the frequency diversity gain (diversity order=2 when using 2 tiles of 3×6). Thus tile size 3×6 is preferred in this case.

Figure 11:
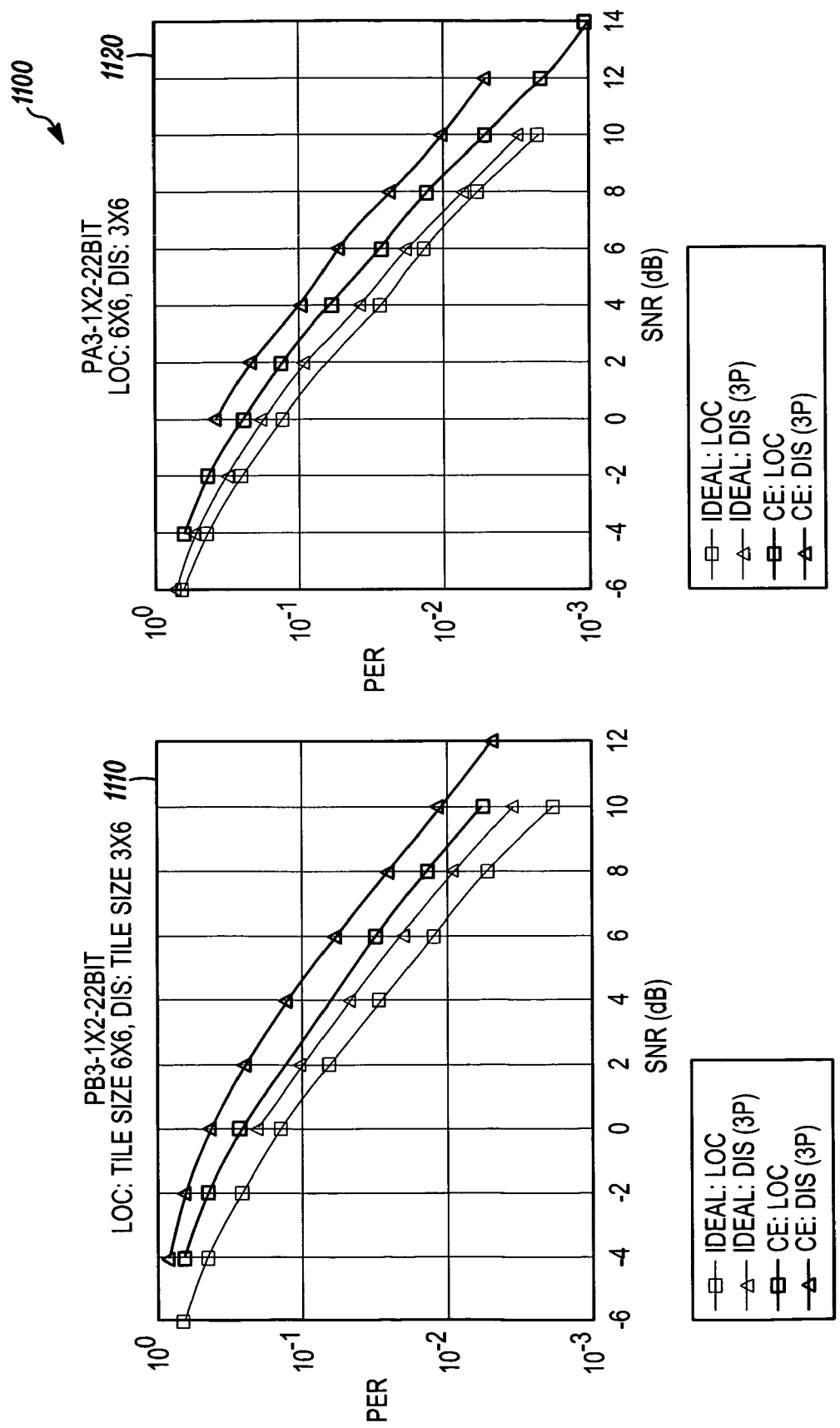
FIG. 11 shows a SNR vs. PER curve of 22-bit SCQICH (PB-3 kmph, PA-3 kmph, 1×2) according to an embodiment of the present invention.
Figure 12:
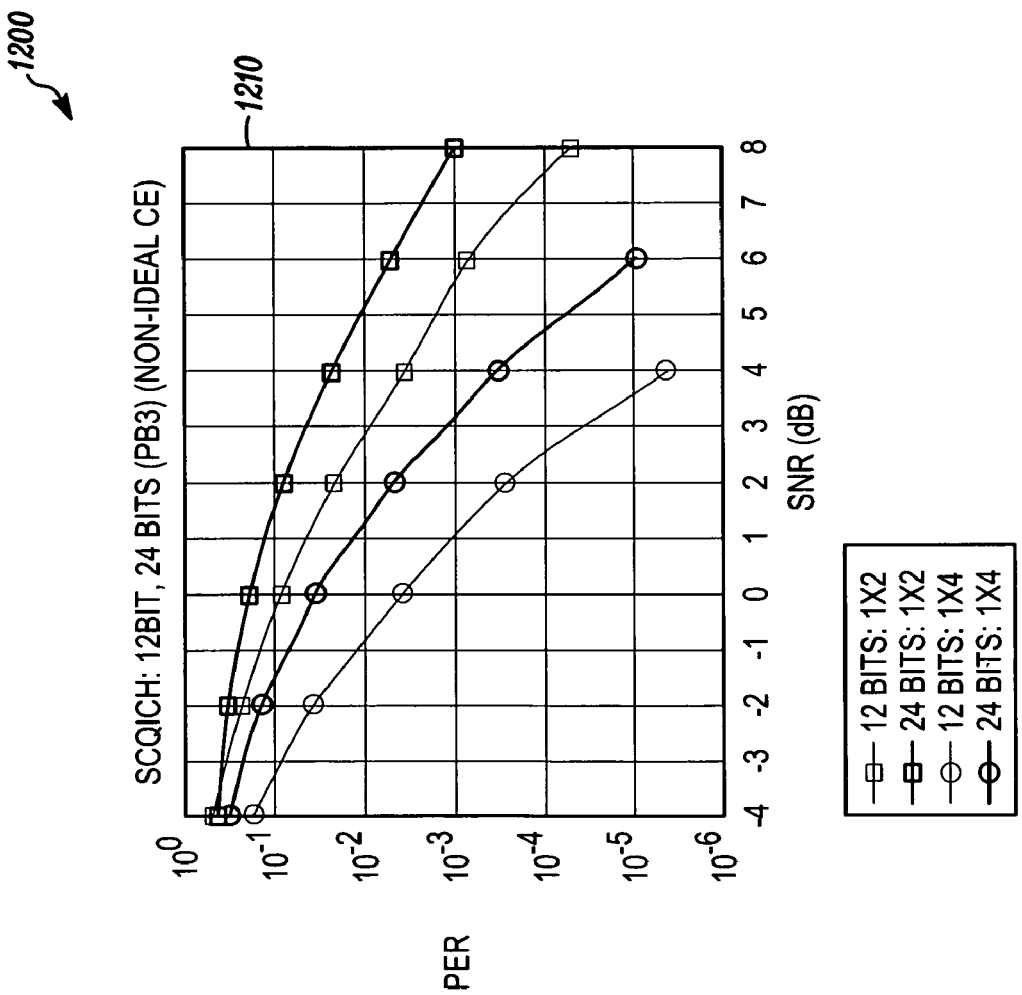
FIG. 12 illustrates a SNR vs. PER curve of 12/24-bit SCQICH (PB-3 kmph, 1×2, 1×4) with tile size 2×6 according to an embodiment of the present invention.

FIG. 11 at 1100 shows performance results of 1×2 under PB-3 kmph and PA-3 kmph when transmitting 22 bits payload with block size of 6×6. We can see clearly that the results of tile size 6×6 outperforms tile size 3×6 about ~2 dB under PB-3 kmph and ~1.5 dB under PA-3 kmph. Thus when transmitting payload bits larger than 11 bits where repetition is skipped, tile size of 6×6 is be preferred compared with that of 3×6. FIG. 12 at 1200 illustrates a SNR vs. PER curve of 12/24-bit SCQICH (PB-3 kmph, 1×2, 1×4) with tile size 2×6 according to an embodiment of the present invention.

While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention.

We claim:

1. An apparatus, comprising:
   a transceiver adapted for use in a wireless network using a fast feedback channel design that incorporates a 2-two level adaptive fast feedback channel framework separating uplink (UL) fast feedback channels into primary and secondary UL fast feedback channels,
   wherein said primary UL fast feedback channel is adapted to use semi-orthogonal sequences of length 12 supporting up to 6 information bits with optimized performance to take advantage of larger diversity order, and
   wherein said primary UL fast feedback channel provides wideband Channel Quality Indicator (CQI) reports with a fixed robust rate and said secondary UL fast feedback channel provides sub-band CQI reports with an adaptive rate operable to communicate a greater amount of data than the fixed robust rate.

2. The apparatus of claim 1, further comprising using link adaptation on said secondary UL fast feedback channel with event-driven transmissions to improve a transmission efficiency with reduced overhead.

3. The apparatus of claim 1, further comprising using optimized BCH codes for both said primary and said secondary fast feedback channels with simplified design and reduced complexity and implementable to fit to different tile sizes.

4. The apparatus of claim 1, wherein said transceiver includes an advanced non-coherent receiver which supports fast feedback channel transmissions with non-coherent detection.

5. A method for transmission of channel quality data in wireless systems, comprising:
    using a fast feedback channel that incorporates a 2-two level adaptive fast feedback channel framework separating uplink (UL) fast feedback channels into primary and secondary UL fast feedback channels;
    adapting said primary UL fast feedback channel to use semi-orthogonal sequences of length 12 supporting up to 6 information bits with optimized performance to take advantage of larger diversity order;
    providing wideband Channel Quality Indicator (CQI) reports using said primary UL fast feedback channel with a fixed robust rate; and
    providing sub-band CQI reports using said secondary UL fast feedback channel with an adaptive rate operable to communicate a greater amount of data than the fixed robust rate.

6. The method of claim 5, further comprising using link adaptation on said secondary UL fast feedback channel with event-driven transmissions to improve a transmission efficiency with reduced overhead.

7. The method of claim 5, further comprising using optimized BCH codes for both said primary and said secondary fast feedback channels with simplified design and reduced complexity and implementable to fit to different tile sizes.

8. The method of claim 5, further comprising incorporating into said transceiver an advanced non-coherent receiver which supports fast feedback channel transmissions with non-coherent detection.

9. A non-transitory computer readable medium encoded with computer executable instructions, which when accessed, cause a machine to perform operations comprising:
    controlling a fast feedback channel that incorporates a 2-two level adaptive fast feedback channel framework separating uplink (UL) fast feedback channels into primary and secondary UL fast feedback channels;
    adapting said primary UL fast feedback channel to use semi-orthogonal sequences of length 12 supporting up to 6 information bits with optimized performance to take advantage of larger diversity order;
    providing wideband Channel Quality Indicator (CQI) reports using said primary UL fast feedback channel with a fixed robust rate; and
    providing sub-band CQI reports using said secondary UL fast feedback channel with an adaptive rate operable to communicate a greater amount of data than the fixed robust rate.

10. The computer readable medium encoded with computer executable instructions of claim 9, further comprising additional instructions that control using link adaptation on said secondary UL fast feedback channel with event-driven transmissions to improve a transmission efficiency with reduced overhead.

11. The computer readable medium encoded with computer executable instructions of claim 9, further comprising additional instructions to control using optimized BCH codes for both said primary and said secondary fast feedback channels with simplified design and reduced complexity and implementable to fit to different tile sizes.

12. The computer readable medium encoded with computer executable instructions of claim 9, further comprising additional instructions that control incorporating into said transceiver an advanced non-coherent receiver which supports fast feedback channel transmissions with non-coherent detection.

13. A system, comprising:
    a base station (BS); and
    a mobile station (MS) adapted for communication with said base station, where said BS and said MS are adapted to use a fast feedback channel design that incorporates a 2-two level adaptive fast feedback channel framework separating uplink (UL) fast feedback channels into primary and secondary UL fast feedback channels,
    wherein said primary UL fast feedback channel is adapted to use semi-orthogonal sequences of length 12 supporting up to 6 information bits with optimized performance to take advantage of larger diversity order,
    wherein said primary UL fast feedback channel provides wideband Channel Quality Indicator (CQI) reports with fixed robust rate and said secondary UL fast feedback channel provides sub-band CQI reports with an adaptive rate.

14. The system of claim 13, further comprising said MS and BS using link adaptation on said secondary UL fast feedback channel with event-driven transmissions to improve a transmission efficiency with reduced overhead.

15. The system of claim 13, wherein said BS and MS use optimized BCH codes for both said primary and said secondary fast feedback channels with simplified design and reduced complexity and implementable to fit to different tile sizes.

* * * * *